(12) United States Patent
Slater

(10) Patent No.: US 6,240,106 B1
(45) Date of Patent: May 29, 2001

(54) RETIMING ARRANGEMENT FOR SDH DATA TRANSMISSION SYSTEM

(75) Inventor: Iain J Slater, Nottingham (GB)

(73) Assignee: Marconi Communications Limited (GB)

( * ) Notice: Subject to any disclaimer, the term of this patent is extended or adjusted under 35 U.S.C. 154(b) by 0 days.

(21) Appl. No.: 08/945,898

(22) PCT Filed: May 3, 1996

(86) PCT No.: PCT/GB96/01071

§ 371 Date: Dec. 24, 1997

§ 102(e) Date: Dec. 24, 1997

(87) PCT Pub. No.: WO96/35275

PCT Pub. Date: Nov. 7, 1996

(30) Foreign Application Priority Data

May 5, 1995 (GB) .................................................. 9509216

(51) Int. Cl.[7] .................................................. H04J 3/06
(52) U.S. Cl. .................................................. 370/517; 375/372
(58) Field of Search .................................................. 370/516, 517, 370/518, 505, 506, 907, 375, 371, 372; 375/371, 372, 376

(56) References Cited

U.S. PATENT DOCUMENTS

| | | | |
|---|---|---|---|
| 5,132,970 | * | 7/1992 | Urbansky ............................... 370/102 |
| 5,172,376 | * | 12/1992 | Chopping et al. ................. 370/100.1 |
| 5,263,056 | * | 11/1993 | Urbansky ............................... 375/112 |
| 5,268,936 | * | 12/1993 | Bernardy ............................... 375/118 |
| 5,327,430 | * | 7/1994 | Urbansky ............................... 370/84 |
| 5,331,641 | * | 7/1994 | Parruck et al. ....................... 370/102 |
| 5,331,671 | * | 7/1994 | Urbansky ............................... 375/118 |
| 5,343,476 | * | 8/1994 | Urbansky ............................... 370/102 |
| 5,359,605 | * | 10/1994 | Urbansky et al. .................... 370/102 |
| 5,361,263 | * | 11/1994 | Urbansky ............................... 370/102 |
| 5,384,774 | * | 1/1995 | Martin et al. ......................... 370/82 |
| 5,526,359 | * | 6/1996 | Read et al. .......................... 370/100.1 |
| 5,537,447 | * | 7/1996 | Urbansky ............................... 375/372 |
| 5,539,750 | * | 7/1996 | Kivi-mannila et al. ............. 370/102 |
| 5,544,172 | * | 8/1996 | Abbas ................................. 370/102 |
| 5,563,877 | * | 10/1996 | Van Tetering et al. ............. 370/58.2 |
| 5,579,323 | * | 11/1996 | Krisher ............................... 370/99 |
| 5,598,445 | * | 1/1997 | Pinto et al. ......................... 375/372 |
| 5,604,773 | * | 2/1997 | Urala ................................. 375/372 |
| 5,666,351 | * | 9/1997 | Oksanen et al. ..................... 370/474 |
| 5,774,509 | * | 6/1998 | Frigerio et al. ..................... 375/371 |
| 5,777,998 | * | 7/1998 | Traverso et al. ..................... 370/509 |
| 5,781,597 | * | 7/1998 | Owen, III et al. ................... 375/372 |
| 5,802,122 | * | 9/1998 | Niegel ................................. 375/372 |
| 5,872,780 | * | 2/1999 | Demiray et al. ..................... 370/359 |

FOREIGN PATENT DOCUMENTS 0 522 748 A2   1/1993   (EP) .

OTHER PUBLICATIONS

Synchrone Netze im richtigen Takt, 2323 Telcom Report (Siemens), 17 (1994) Mai/Juni, No. 3, Munchen, DE, pp. 118–121.

* cited by examiner

*Primary Examiner*—Chau Nguyen
*Assistant Examiner*—D. Trinh
(74) *Attorney, Agent, or Firm*—Kirschstein, et al.

(57) ABSTRACT

A retiming arrangement for use in a demultiplexer in an SDH data transmission system uses Bit Justification data, and not Pointer data, to modify a recovered clock signal and generate a clock signal for retiming purposes. The invention is especially for use in enabling third party users to carry primary rate timing data across an SDH network.

6 Claims, 2 Drawing Sheets

RETIMING ARRANGEMENT FOR SDH DATA TRANSMISSION SYSTEM

BACKGROUND OF THE INVENTION

The present invention relates to a retiming arrangement for use in an SDH (Synchronous Digital Hierarchy) data transmission system. In particular the invention is concerned with the provision of an arrangement by which third parties wishing to use an SDH link which is controlled by another operator may carry their own timing and other information across that network.

Third party timing is defined when the timing to be carried in a primary rate signal originates from a source which is not synchronous with the source used to time the SDH network. Third party timing is therefore plesiochronous to the bearer clock.

In SDH, primary rate signals are mapped into high bit rate Synchronous Transport Modules (STM-N), at the insertion point of the network using virtual containers (VC) and tributary units (TU), the size and type of which depends on the data rate of the signal being carried. Many of these TU's are multiplexed together into a single STM-N. At the extraction point the STM-N is demultiplexed and demapped back into primary rate signals. However the signals suffer from phase and frequency distortions which effect the quality of the signal when used for transporting timing information. The key component in SDH systems used to reduce these distortions is the so-called desynchronizer or retiming arrangement.

SUMMARY OF THE INVENTION

The present invention arose in an attempt to improve the system disclosed in our co-pending British patent application 9114841.1, published as GB 2257603A on Jan. 13, 1993, the contents of which are hereby incorporated into this application by this reference. The aim of the present invention is to permit third parties using their own primary rate timing source to carry timing information over an SDH network which is operated by a first party. This is not currently possible and as shown in FIG. 1B of the above mentioned document a separate channel needs to be provided to carry this timing information.

In the above mentioned document either both pointer data and Bit Justification data are used for retiming purposes, or neither such data, timing being provided at the primary rate output on the assumption that the primary rate signal is synchronised to the bearer. The applicants have appreciated that if Bit Justification data is used without the Pointer data, then an SDH network can be adapted to carry such third party timing information without providing a separate link.

In one aspect the invention provides a retiming arrangement for an SDH (Synchronized Digital Hierarchy) data transmission system by which third parties may use an SDH link, comprises an input (5) for receipt of a multiplexed STM (Synchronous Transport Module) a signal, a clock recovery circuit (20) for recovering a clock signal from the STM signal, a demultiplexer (21) for demultiplexing the STM signal into a plurality of TU (Tributary Unit) signals, a pointer processor (25) for reading pointer data from a TU signal, a bit dejustifier (28) for reading bit justification data from the TU signal, a buffer store (30) with a store monitor (34) in which store (30) the processor TU data is stored temporarily before being clocked out at a retimed clock rate, wherein said retiming arrangement is characterised in that means (32) for generating the retimed clock signal (31), are provided, which means (32) includes three phase adjust inputs ($\phi1$, $\phi2$, $\phi3$) which are connected to the pointer processor (25), bit dejustifier (28) and store monitor (34) respectively whereby only the read bit justification data generated by the bit dejustifier (28) is used (on phase adjust input $\phi2$) to modify the recovered clock signal (23) and generate the retimed clock signal (31).

An embodiment of the invention will now be described by way of example with reference to the drawings in which;

DETAILING DESCRIPTION OF THE PREFERRED EMBODIMENTS

Figure 1:
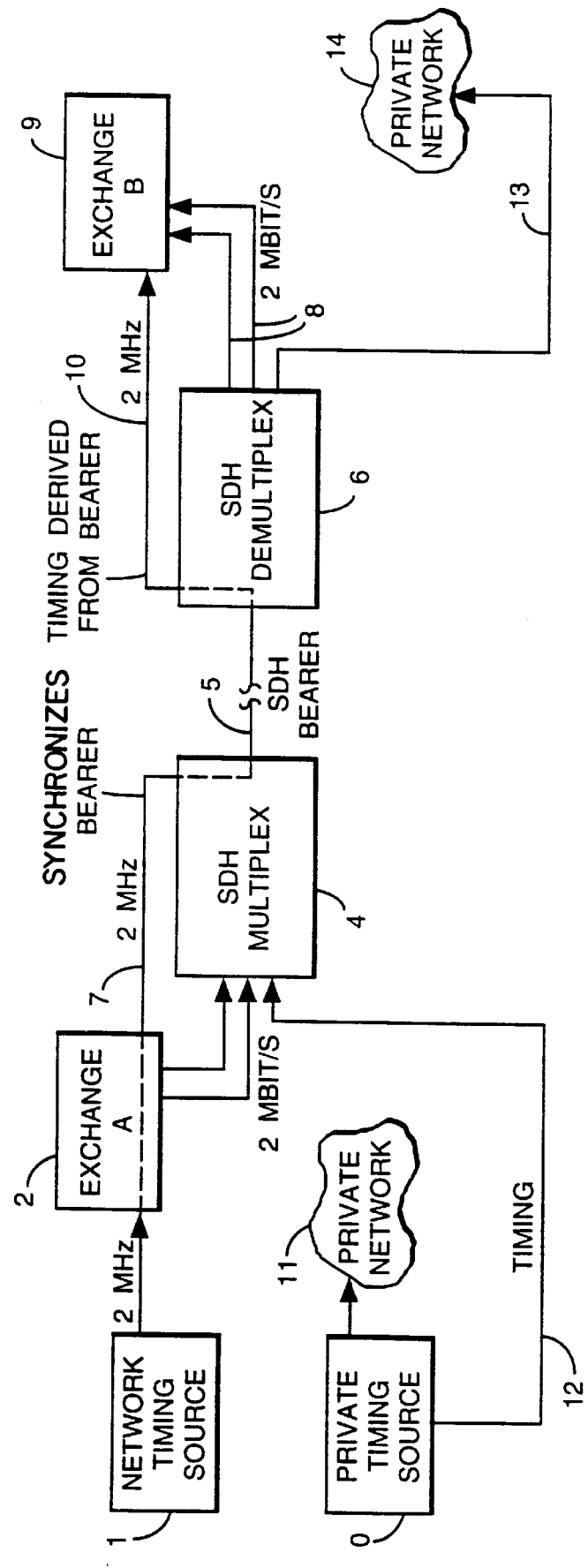
FIG. 1 shows schematically an SDH network together with a third party user.

Referring to FIG. 1 an SDH network comprises a network timing source 1 which feeds an, e.g., 2 MHz signal into an exchange 2. The exchange feeds 2 Mbit signals over N, two as shown, signal connections 3 into an SDH multiplexer 4. The multiplexed STM-N signal is then fed over an SDH bearer 5 to an SDH demultiplexer 6. The exchange 2 is also connected to the SDH multiplexer 4 by a control line 7 which synchronizes the bearer 5 at the 2 MHz clock rate. Within the demultiplexer 6 the signal is converted back into the 2 Mbit/s primary rate format and fed over lines 8 to an exchange 9. A line 10 corresponding to line 7 is provided for deriving timing information from the bearer.

In addition and by using a retiming arrangement as will be described, a third party user can use the SDH network for conveying timing and other data from a private network 11. A private timing source 10, which is not synchronous with the network timing source 1, transmits timing signals, i.e. primary rate signals at 1.544Mbit/s or 2.048 Mbit/s through a link 12 to the SDH multiplexer 4. After demultiplexing the timing signals are conveyed along line 13 to the private network 14. It can be seen that by comparing FIG. 1 to FIG. 1b of our copending British application mentioned previously that the timing information from the third party had in the past to be carried along a separate link.

Figure 2:
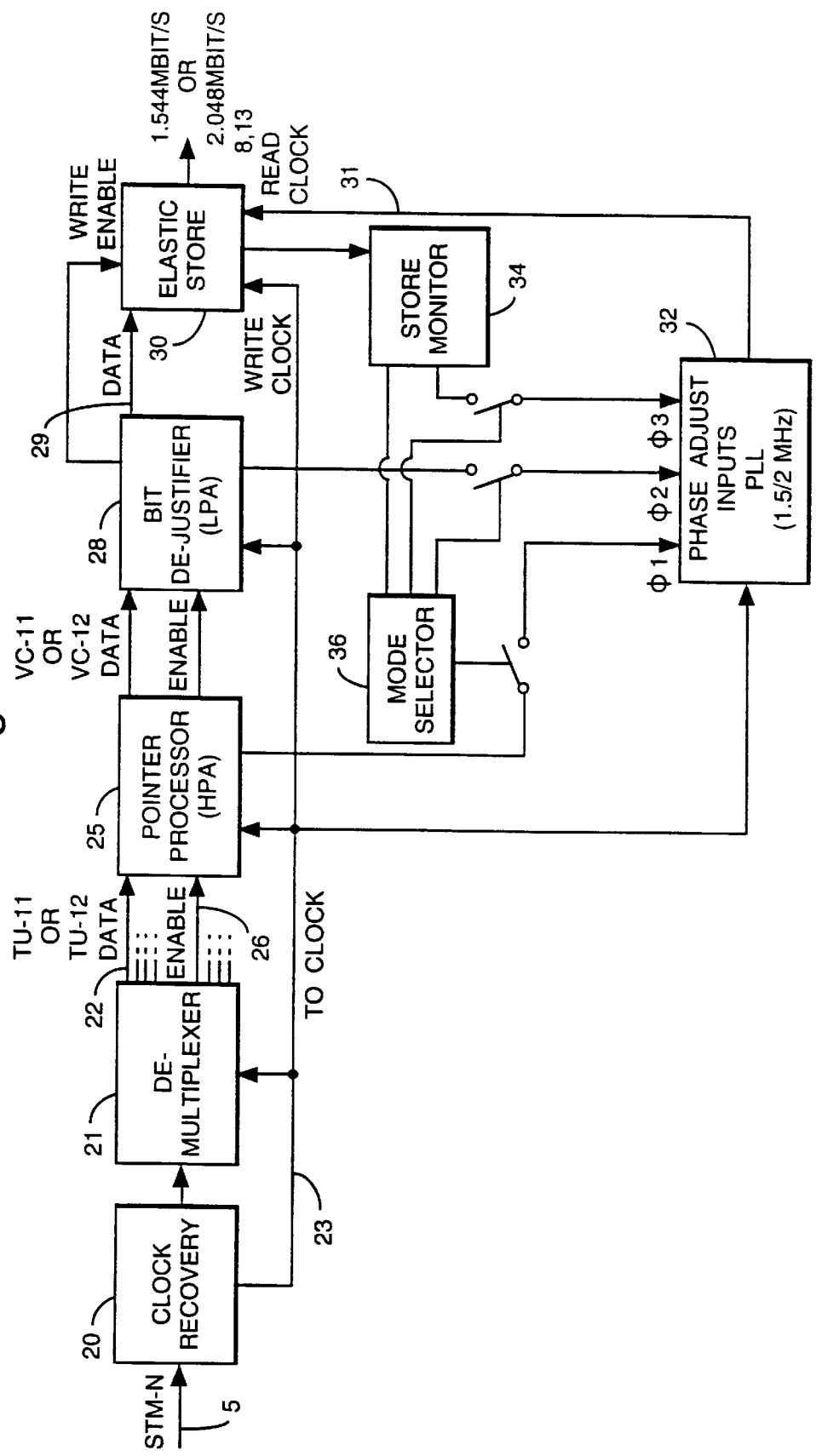
FIG. 2 is a block diagram illustrating a retiming arrangement according to the invention.

Referring now to FIG. 2, the demultiplexer 6 together with the desynchronizer or retiming arrangement is shown in more detail. A multiplexed STM-N signal is input firstly to a clock recovery circuit 20 where a so called 'TO' clock signal is stripped off on to line 23. After that the multiplexed signal is then passed to a demultiplexer 21 where it is demultiplexed into N low order signals, so called TU-11 or TU12 data dependent on the bit rate of the primary signals (1.544 Mbit/s or 2.048 Mbit/s respectively). Each of the N primary rate signals 22 is then passed to a retiming arrangement. Although as shown only one such arrangement is provided for the one demultiplexer, in practice a separate circuit would be provided for each of the N channels 22. The TU data is firstly passed to a pointer processor 25. The pointer processor is part of the high order path adaptation (HPA) and functions to interpret differences in phase and frequency between the clocks at the point of insertion and point of extraction of the SDH network, which are encoded by the TU pointer. "Pointers" are described in more detail in our co-pending British application referred to previously. In essence each virtual container or VC signal is allowed to float within the aggregate stream of bytes, such that the starting point of the VC within the overall SDH signal can change from one signals' successive frame to another. The pointer value determines the start point of the particular VC.

The pointer processor 25 in addition receives an enable signal on line 26 which functions as a dynamic flag to indicate whether the data in any particular TU signal is true or real data, as opposed to being an overhead.

After the pointer processor, the resulting VC data is transferred to a bit dejustifier 28 which forms part of the low order path overhead (LPA).

Bit justification is defined within CCITT standards. In essence bit justification data provides a means of indicating where a 2 Mbit data signal is located within a VC. For example at the point of injection into the system there may be more traffic data than can be accommodated within the byte space allocated for that purpose. Any overflow may be accommodated within the justification overhead bytes. Bit justification is used to provide a means of indicating that traffic data is located within the justification overhead bytes and that this needs to be retrieved before the signal can be sent on for further processing. Following bit dejustification the remaining data is passed to an elastic store 30 where temporary phase transients due to gaps caused by the extraction of overhead and justification bytes are absorbed. The primary rate signal 29, retimed by means to be described is then read out of the elastic store on lines 8 or 13, using the numbering shown in FIG. 1.

A phase locked loop 32 is operative to take as an input the bearer reference TO clock signal recovered at stage 20 and to output a modified read clock signal for use in retiming data out of the elastic store 30. The read clock signal 31 can be derived in any one of a number of ways. The phase lock loop 32 includes three phase adjust inputs $\phi 1$, $\phi 2$ and $\phi 3$. These are connected to the pointer processor 25, bit dejustifier 28 and a store monitor 34 respectively. Which, or what combination of input are used is controlled by a mode selector 36 which operates respective switches for each of the phase adjust inputs.

Operation of the circuit will firstly be described with reference to normal—i.e. non third party use. In a first mode the $\phi 3$ input is selected and the store monitor 34 is arranged to ensure that the elastic store 30 remains half filled such that the rate of the data leaving the store equals the rate at which it is entering the store. In this way the primary rate timing signal can be accurately reproduced.

In a second mode phase inputs $\phi 1$ and $\phi 2$ are selected, with $\phi 3$ being disabled. In this mode the recovered bearer clock on line 23 is used directly with phase adjustments being made by the pointer processor 25 and bit dejustifier 28.

When the above circuit is to be used for primary rate retiming for a third party user, neither of the above modes can be used. The above mentioned desynchronizer operation produces TU pointer adjustment resulting in a phase transient of about 3.5 micro seconds per pointer at the output of the SDH network. A good desynchroniser design will attempt to limit the rate of leak out of this phase by limiting the corresponding frequency shift of the desynchroniser PLL. This limiting normally takes the phase form of narrowing the PLL bandwidth resulting in closely spaced pointer adjustments of opposite polarity cancelling out and having no net effect on the final output. However, pointer adjustments of opposite polarity that are not widely separated (by a factor greater than the RC time constant of the PLL) will not cancel.

Within synchronized SDH networks TU-1 pointer changes will occur as a result of slowly varying phenomenon such as temperature effects on optical fibres and multiplexer equipment.

While much equipment is tolerant of these phase steps introduced to primary rate signals there are some systems which being designed for plesiochronous digital hierarchy (PDH) transmission which only employ bit justification techniques, have a tolerance of less than one microsecond. The invention offers a means by which the effects of TU-1 pointer changes can be eliminated leaving the output phase response of the desynchronizer to be comparable with that of bit dejustification.

In the third mode of operation, for use in primary rate retiming for third parties, the mode selector 36 is operated such that, in normal third party operation, only the $\phi 2$ input is enabled such that only bit dejustification data is used to adjust the TO clock frequency. While as shown the $\phi 1$ input is disabled, in an alternative arrangement the PLL may be operative to respond to $\phi 1$ adjustments, but to cancel each occurrence with one of equal size and of opposite polarity. Thus operation is in similar manner as a PDH demultiplexer. As a safeguard, input $\phi 3$ is also enabled, but the store monitor 34 and elastic store 30 are operated in a different way as will now be described.

As long as the SDH network remains synchronization, ignoring the pointers will have no long term effect on the timing carried within the primary rate signal. In fact any temporary loss of synchronization or large amounts of wander in the SDH network will be accommodated within the elastic store 30. This is designed to be relatively large, typically in excess of 40 microseconds to accommodate the maximum permitted wander in an SDH path. If SDH network synchronization is lost for a long period of time the effect would eventually be an underflow or overflow of the elastic store 30. The store monitor 34 would then initiate a leak out of phase to recover capacity in the elastic store 32. Thus the store monitor 34 operates in a different way to that described with reference to normal, or non third-party use. As an alternative the capacity could be recovered by reverting the desynchronize operation temporarily back to one of the fist two modes—i.e. using only the store monitor on the $\phi 3$ input or adjustment using both $\phi 1$ and $\phi 2$ for a limited period of time.

What is claimed is:

1. A retiming arrangement for a synchronous digital hierarchy (SDH) data transmission system by which third parties use an SDH link, comprising: an input for receipt of a multiplexed synchronous transport module (STM) signal; a clock recovery circuit for recovering a clock signal from the STM signal; a demultiplexer for demultiplexing the STM signal into a plurality of tributary unit (TU) signals; a pointer processor for reading pointer data from a TU signal; a bit dejustifier for reading bit justification data from the TU signal; a buffer store with a store monitor in which store the processor TU data is stored temporarily before being clocked out at a retimed clock rate; a phase-locked loop having three phase adjust inputs; and a mode selector and switching circuit for connecting the pointer processor, bit dejustifier, and store monitor, in different modes, to the three phase adjust inputs, said circuit, in a first mode, being operative for connecting the bit dejustifier to one of the phase adjust inputs for selecting only the read bit justification data generated by the bit dejustifier to modify the recovered clock signal and generate the retimed clock signal.

2. The retiming arrangement according to claim 1, wherein the store is an elastic store, and wherein the phase-locked loop is further operative for checking for an underflow and overflow condition of the store and for making an adjustment to the retimed clock signal so as to maintain capacity within the store.

3. The retiming arrangement according to claim 1, wherein the circuit is operative, in a second mode, for connecting the bit dejustifier and the pointer processor to two of the phase adjust inputs to modify the recovered clock signal using both the read bit justification data and the pointer data to generate the retimed clock signal.

4. The retiming arrangement according to claim 1, wherein the phase-locked loop is operative, in a third mode of operation, for checking that the store is approximately half full and for adjusting the rate of the retimed clock signal so as to maintain the half full condition.

5. The retiming arrangement according to claim 1, wherein the phase-locked loop receives the recovered clock signal at one of the phase adjust inputs and generates the retimed clock signal at an output, and adjusts the frequency of the output at another of the phase adjust inputs.

6. The retiming arrangement according to claim 1, wherein the phase-locked loop is further operative for nullifying the effect of utilizing pointer data by modifying the recovered signal twice using pointer data of equal amplitude but opposite polarity.

* * * * *